UNITED STATES PATENT OFFICE.

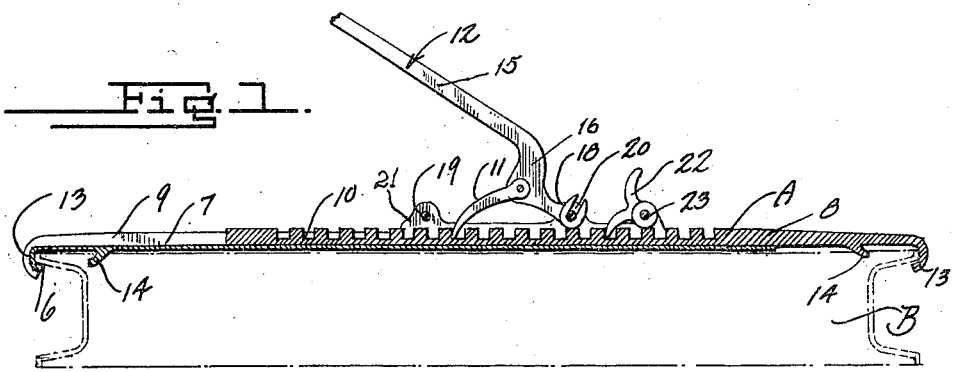
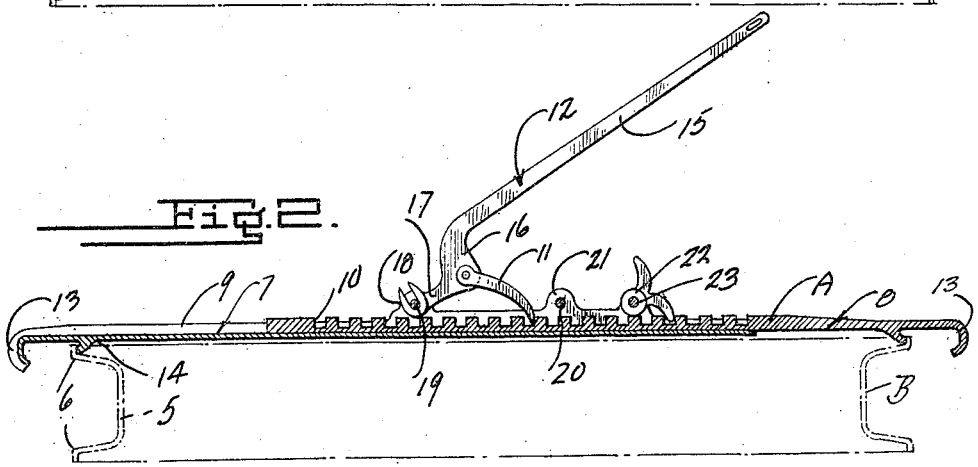
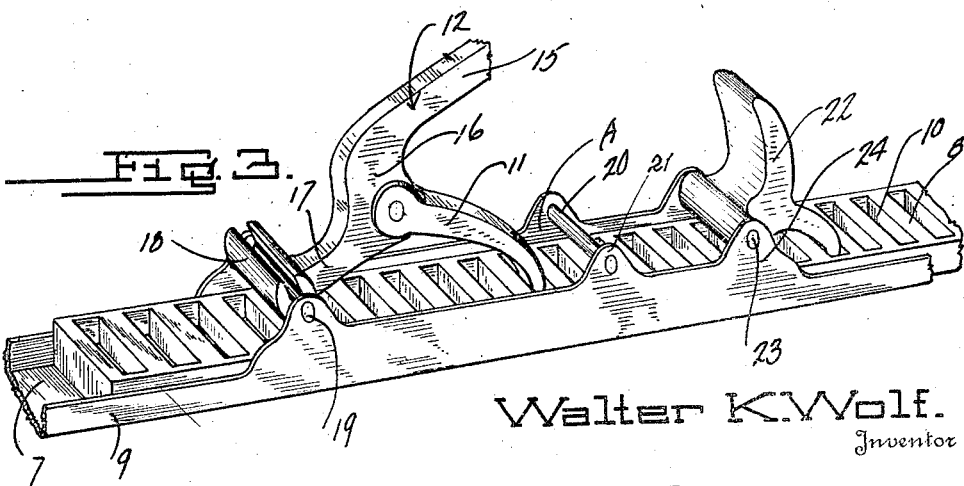
Walter K. Wolf,
Inventor

WALTER K. WOLF, OF BROWNSTOWN, PENNSYLVANIA.

TOOL FOR EXPANDING AND CONTRACTING RIMS.

1,410,861.

Specification of Letters Patent. Patented Mar. 28, 1922.

Application filed June 9, 1920. Serial No. 387,700.

*To all whom it may concern:*

Be it known that I, WALTER K. WOLF, a citizen of the United States, residing at Brownstown, in the county of Lancaster and State of Pennsylvania, have invented certain new and useful Improvements in a Tool for Expanding and Contracting Rims, of which the following is a specification.

This invention relates to rim tools, and the primary object of the invention is to provide an improved device for quickly and easily contracting and expanding split wheel rims, so as to facilitate the removal and placing of tire casings on the rim and eliminate the inconveniences heretofore experienced in this regard.

Another object of the invention is to provide an improved rim expander and contractor embodying a pair of slidably connected bars, an improved means for sliding the bars toward or away from each other, and an improved means formed on the outer ends of the bars for engaging the rim when the same is to be expanded or contracted, said means preventing the accidental displacement of the bars from the rim during its adjustment.

A further object of the invention is to provide an improved rim expander and contractor in which a novel type of adjusting lever is provided, the lever being so associated with the device that the position thereof can be quickly and easily reversed, so that the bars constituting the adjusting members for the rim can be moved toward or away from each other to permit of the effective expanding and contracting of a rim, the lever also being associated with the device in such a manner that the same can be detached entirely from the adjusting bar when the device is not in use, thereby permitting the device to be stored in a very small space.

A still further object of the invention is to provide an improved tool for expanding and contracting vehicle wheel rims of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings;

Figure 1 is a vertical longitudinal section through the improved tool showing the same in position on a rim for contracting the same.

Figure 2 is a similar view showing the tool in position on a rim for expanding the same, and Figure 3 is an enlarged fragmentary perspective view of the improved tool illustrating the means for associating the adjusting lever therewith.

Referring to the drawings in detail, wherein similar reference characters designate corresponding parts throughout the several views, the letter A generally indicates the improved rim expander and contractor and B a vehicle rim.

The rim B is of the ordinary or any preferred construction and is provided with the usual slit to permit the expansion and contraction thereof. As shown the rim B includes the annular body 5 and the outwardly extending flanges 6.

The improved rim expander and contractor A includes a pair of bars 7 and 8 connected together for sliding movement. The bar 7 constitutes the guide for the bar 8 and its side longitudinal edges are provided with upstanding flanges 9, which define a guide track for the bar 8. The provision of these flanges absolutely precludes lateral movement of the bars in relation to each other. The bar 8 constitutes the adjusting bar and its upper face is provided with a plurality of rack teeth 10 which are adapted to be engaged by a pawl 11 carried by the adjusting lever 12 which is of novel construction and will be hereinafter more fully described. The outer ends of the bars 7 and 8 are provided with means for engaging the rim when the same is to be expanded or contracted and this means consists of hooks 13, which are formed by bending the outer ends of the rods downwardly and inwardly. The hooked ends 13 are adapted to engage the outer face of the flanges 6 of the rim B when the rim is to be contracted. The outer terminals of the bars inward of the hooks 13 are provided with outwardly extending hooks 14 which are disposed in opposite direction to the hooks 13 and these hooks are adapted to engage the inner surface of the flanges 6 when the rim B is to be expanded. Thus it can be seen that an effective means has been provided for each outer terminal of the bars 7 and 8 for effectively engaging the rim when the same is to be contracted or expanded.

The improved adjusting lever 12 constitutes an elongated body or bar 15, the lower terminal of which is bent inwardly substantially at right angles to the body to form a foot 16. The lower terminal of this foot is then bent outwardly to provide an extension 17 which lies substantially parallel to the body 15 of the lever. The terminal of the extension 17 is provided with a knuckle or open hinge barrel 18, which is adapted to detachably engage either one of a pair of pins 19 and 20, which are arranged transversely of the bars 7 and 8. These pins 19 and 20 are carried by upstanding ears 21 formed on the upper surfaces of the guide flanges 9. The knuckle or hinge barrel 18 opens outwardly, and it can be seen that when the body 15 of the lever 12 is disposed in certain relation to the bars 7 and 8, the knuckle or open hinge barrel can be readily slipped off of the pin which it is in engagement with. The foot 16 at the lower portion thereof carries the pivoted dog 11, and this dog is adapted to engage any one of the rack teeth 10 formed on the upper surface of the bar 8.

To hold the bar 8 in any adjusted position in relation to the bar 7, a double pawl 22 is provided. This double pawl 22 is mounted upon a pin 23, which is arranged transversely across the bar, and the pin is carried by upstanding ears 24 formed on the guide flanges 9.

In operation of the improved tool, when it is desired to contract a rim so as to facilitate the removing or placing of the tire casing thereon, the hooks 13 are placed in engagement with the outer surface of the flanges 6 of the rim B. The knuckle 18 or hinge barrel is placed on the pin 20 and the pivoted dog 11 is placed in engagement with any one of the rack teeth 10 formed on the upper surface of the bar 8. The lever 12 is then swung downwardly which will push the dog 11 toward the outer end of the bar 7 and thus push the bar 8 inwardly and bring the hooked terminals 13 of the bars 7 and 8 towards each other. This will effectively contract the rim. As the bars 7 and 8 move inwardly, the double ended pawl 22 rocks on the pivot pin 23 and permits the bar 8 to pass inwardly. As soon as the dog 11 disengages the teeth 10 the double ended pawl 22 will prevent outward movement of the bar 8 in relation to the bar 7.

When it is desired to expand the rim, the double ended pawl 22 is swung on the pivot pin 23 so as to engage the rack teeth 10 on the outer side of the pin 23. The lever 12 is then swung so as to permit the disengagement of the knuckle or open hinge barrel 18 from the pin 20 and the same is then removed from the pin. After the lever has been disengaged from the pin 20, the same is placed in engagement with the pin 19 with the dog 11 disposed innermost and the hooks 14 are placed in engagement with the inner surface of the flanges 6 of the rim B. The lever 12 is then swung inwardly which will push the dog 11 outwardly and thus move the hooks 14 away from each other in opposite directions which will effectively expand the rim. The position of the double pawl 22 permits of an inward movement of the bar and effectively holds the rim in its expanded condition.

From the foregoing specification, it can be seen that an improved rim contractor and expander has been provided of exceedingly simple and durable construction, which will considerably facilitate the positioning and removing of the tire casing from a rim.

Changes in details may be made without departing from the spirit or scope of this invention; but,

I claim:

1. In a tool, the combination with a pair of slidably connected members, means carried by the terminals of the members for engaging the work, a pair of spaced pins carried by one of the members, a reversible operating lever for detachably engaging either one of said pins, means carried by the lever for operatively engaging the other member, and means carried by one of the members for engaging the other member to lock said members in an adjusted position in relation to each other.

2. In a tool for expanding and contracting wheel rims for tires, the combination with a pair of slidably connected bars, means formed on the outer terminals of the bars for detachably engaging the inner and outer surfaces of a rim, a pair of spaced pins carried by one of the bars, a reversible lever arranged to detachably engage either one of said pins, a rack face formed on the other bar, a pivoted dog carried by the lever arranged to engage the rack face, and a reversible pawl arranged to engage the rack face formed on said bar to hold the bars in their adjusted positions.

3. In a tool for expanding and contracting vehicle rims for tires, the combination with a bar having a guide formed thereon, a second bar slidably mounted on the upper surface of the first bar, a pair of spaced transversely extending pins carried by the first bar, a rack face formed on the upper surface of the second bar, an adjusting lever including a body, a right angularly extending foot formed on the lower end of the body, a vertically extending extension formed on said foot, an open knuckle carried by the free terminal of the extension arranged to detachably engage either one of said pins, a pivoted dog carried by the lower end of said foot arranged to extend in opposite direction from said knuckle, the dog being adapted to engage the rack face of the other bar, a double pawl rotatably carried by the first bar and arranged to receive the rack face of the second bar, and means formed on the outer terminals of the bars for engaging the rim.

WALTER K. WOLF.